(12) United States Patent
Zhang et al.

(10) Patent No.: US 12,149,071 B2
(45) Date of Patent: Nov. 19, 2024

(54) HIGH-FREQUENCY SIGNAL-BASED POWER CONSUMER RELATIVE POSITION IDENTIFICATION APPARATUS, METHOD AND DEVICE

(71) Applicant: CHINA SOUTHERN POWER GRID TECHNOLOGY CO., LTD., Guangdong (CN)

(72) Inventors: Sijian Zhang, Guangdong (CN); Xiaoping Zhang, Guangdong (CN); Guan Chen, Guangdong (CN); Zheng Zeng, Guangdong (CN); Zihang Huo, Guangdong (CN); Jiaming Wu, Guangdong (CN)

(73) Assignee: CHINA SOUTHERN POWER GRID TECHNOLOGY CO., LTD., Guangdong (CN)

( * ) Notice: Subject to any disclaimer, the term of this patent is extended or adjusted under 35 U.S.C. 154(b) by 33 days.

(21) Appl. No.: 18/266,218

(22) PCT Filed: Dec. 7, 2021

(86) PCT No.: PCT/CN2021/136042
§ 371 (c)(1),
(2) Date: Jun. 8, 2023

(87) PCT Pub. No.: WO2022/121887
PCT Pub. Date: Jun. 16, 2022

(65) Prior Publication Data
US 2023/0387716 A1 Nov. 30, 2023

(30) Foreign Application Priority Data

Dec. 9, 2020 (CN) .......................... 202011430866.8

(51) Int. Cl.
*H02J 13/00* (2006.01)
*G06Q 50/06* (2024.01)

(52) U.S. Cl.
CPC ........ *H02J 13/00002* (2020.01); *G06Q 50/06* (2013.01); *H02J 13/00007* (2020.01)

(58) Field of Classification Search
CPC .. H02J 13/00002; H02J 13/00007; H02J 3/00; H02J 2203/10; G06Q 50/06; Y02B 90/20; G01R 35/04
See application file for complete search history.

(56) References Cited

U.S. PATENT DOCUMENTS 3,443,440 A * 5/1969 Porter .................... G01H 1/003
73/462
5,301,121 A * 4/1994 Garverick .............. G01R 19/25
702/60
(Continued)

FOREIGN PATENT DOCUMENTS

CN 104020367 A 9/2014
CN 204177891 U 2/2015
(Continued)

OTHER PUBLICATIONS

International Search Report for PCT/CN2021/136042 mailed Mar. 1, 2022, ISA/CN.
(Continued)

*Primary Examiner* — Ziaul Karim
(74) *Attorney, Agent, or Firm* — Apex Attorneys at Law, LLP; Yue (Robert) Xu (57) ABSTRACT

A device, a method for determining relative positions of power consumers based on a high-frequency signal, and a computer-readable storage medium are provided. The device is applied to a distribution transformer supply zone. The device includes a resonance or signal generator and a direction detector, the resonance or signal generator is
(Continued)

disposed in a user electricity meter, the direction detector is disposed on a power line, the resonance or signal generator is configured to transmit a high-frequency signal or generate resonance in response to the high-frequency signal; the direction detector is configured to monitor a voltage and a current of the high-frequency signal flowing into the user electricity meter, and determine, based on a phase difference between the voltage and the current, a relative position relationship of two adjacent user electricity meters on the power line.

4 Claims, 2 Drawing Sheets

(56) References Cited

U.S. PATENT DOCUMENTS

| | | | |
|---|---|---|---|
| 7,076,378 B1 | 7/2006 | Huebner | |
| 2012/0187770 A1* | 7/2012 | Slota | H02J 3/42 |
| | | | 307/87 |
| 2013/0201316 A1* | 8/2013 | Binder | G07C 3/02 |
| | | | 701/2 |
| 2015/0246614 A1* | 9/2015 | Dames | H05K 9/0075 |
| | | | 191/10 |
| 2019/0154439 A1* | 5/2019 | Binder | G01S 15/08 |

FOREIGN PATENT DOCUMENTS

| | | |
|---|---|---|
| CN | 107069678 A | 8/2017 |
| CN | 206876762 U | 1/2018 |
| CN | 110299763 A | 10/2019 |
| CN | 112019241 A | 12/2020 |
| CN | 112596018 A | 4/2021 |
| IN | 110554235 A | 12/2019 |

OTHER PUBLICATIONS

Lian Wei et al. Research on Platform are identification model and its differentiation Technology of electricity information acquisition system.

* cited by examiner

HIGH-FREQUENCY SIGNAL-BASED POWER CONSUMER RELATIVE POSITION IDENTIFICATION APPARATUS, METHOD AND DEVICE

CROSS REFERENCE OF RELATED APPLICATION

The application is the national phase of PCT International Patent Application No. PCT/CN2021/136042, titled "HIGH-FREQUENCY SIGNAL-BASED POWER CONSUMER RELATIVE POSITION IDENTIFICATION APPARATUS, METHOD AND DEVICE", filed on Dec. 7, 2021, which claims priority to Chinese Patent Application No. 202011430866.8, titled "HIGH-FREQUENCY SIGNAL-BASED POWER CONSUMER RELATIVE POSITION IDENTIFICATION APPARATUS, METHOD AND DEVICE", filed on Dec. 9, 2020 with the China National Intellectual Property Administration, both of which are incorporated herein by reference in their entireties.

FIELD

The present disclosure relates to the technical field of positioning, and in particular to a device, a method and an apparatus for determining relative positions of power consumers based on a high-frequency signal.

BACKGROUND

Determination of relative positions of power consumers in a low-voltage distribution transformer supply zone is of great significance to network topology analysis, line loss control, low-voltage control, fault location, and other power supply problems in the distribution transformer supply zone. The relative positions of the power consumers refer to a relative position relationship (upstream-downstream relationship) of all users on a power line within the distribution transformer supply zone. There are conventional methods for determining relative positions of power consumers in a distribution transformer supply zone, including voltage comparison, carrier communication, switching off by branches combined with manual check, and the like. These methods have limitations to some extent and cannot be applied to all distribution transformer supply zones.

The method of voltage comparison is to determine relative positions of all user electricity meters by ordering voltage amplitudes of the user electricity meters in the distribution transformer supply zone based on a principle that a voltage drop occurs in power supply from a head to an end in the distribution transformer supply zone. With this method, the relative upstream-downstream position relationship of most power consumers in the distribution transformer supply zone can be effectively determined. In a case that a photovoltaic or reactive compensation device exists in the distribution transformer supply zone, or some of the user electricity meters have significant metering errors, a voltage of a downstream user electricity meter is greater than a voltage of an upstream user electricity meter. Hence, relative positions of the user electricity meters cannot be correctly obtained through the voltage comparison.

In the method of carrier communication, a carrier signal generation module is disposed in a concentrator, and a signal receiving module is disposed in a user electricity meter. Relative positions of the user electricity meter and the concentrator are estimated based on relative strengths of a received signal under a same transmission power. A carrier signal is easily affected by electromagnetic interference, and has a large attenuation fluctuation and other characteristics. Hence, the carrier communication has a poor effect in practice.

In the method of combining switching off by branches with manual check, a switch of a branch is powered off, a manual check is performed to determine which user electricity meter belongs to the branch, and thereby relative positions of the users in the distribution transformer supply zone are determined. With this method, relative positions of units can be determined to a level of branch switches, and specific position relationship of users connected to a branch switch cannot be determined. This method has high labor cost, and is not conducive to rapid determination of relative positions of power consumers in the distribution transformer supply zone, and results in affect in quality of power supply due to powering off.

Therefore, relative positions of power consumers in a distribution transformer supply zone determined through the conventional methods have a large error and unreliable accuracy.

SUMMARY

A device, a method and an apparatus for determining relative positions of power consumers based on a high-frequency signal are provided according to embodiments of the present disclosure, in order to solve the technical problem that relative positions of power consumers in a distribution transformer supply zone determined through the conventional methods have a large error and unreliable accuracy.

To achieve the objective, the following technical solutions are provided according to the embodiments of the present disclosure.

A device for determining relative positions of power consumers based on a high-frequency signal is provided. The method is applied to a distribution transformer supply zone, and includes a resonance or signal generating module and a direction determining module. The resonance or signal generating module is disposed in a user electricity meter, and the direction determining module is disposed on a power line. The resonance or signal generating module is configured to transmit a high-frequency signal or generate resonance in response to the high-frequency signal. The direction determining module is configured to: monitor a voltage and a current of the high-frequency signal inputted into the user electricity meter; and determine, based on a phase difference between the voltage and the current, a relative position relationship of two adjacent user electricity meters on the power line.

In an embodiment, the distribution transformer supply zone includes at least two user electricity meters; two of the user electricity meters are connected in parallel between a neutral wire and a live wire; the live wire for the two user electricity meters serves as the power line; each of the user electricity meters is provided with the resonance or signal generating module; and the two user electricity meters are defined as a first user electricity meter and a second user electricity meter. The resonance or signal generating module in the first user electricity meter is configured to transmit the high-frequency signal, and the resonance or signal generating module in the second user electricity meter is configured to generate resonance in response to reception of the high-frequency signal. The direction determining module is configured to monitor a voltage and a current of the high-frequency signal flowing into the second user electricity meter.

In an embodiment, the direction determining module is further configured to obtain a phase difference from the current and the voltage flowing into the second user electricity meter; determine that the second user electricity meter is located downstream of the first user electricity meter, in a case that an absolute value of the phase difference is less than 90 degrees; and determine that the second user electricity meter is located upstream of the first user electricity meter, in a case that the absolute value of the phase difference is greater than 90 degrees and less than 180 degrees.

A method for determining relative positions of power consumers based on a high-frequency signal is further provided in the present disclosure. The method is applied to a distribution transformer supply zone. The method is based on the device for determining relative positions of power consumers based on a high-frequency signal. The method includes: S10, transmitting a high-frequency signal by using a resonance or signal generating module of a first user electricity meter of arbitrary two adjacent user electricity meters, and generating resonance in response to reception of the high-frequency signal by using a resonance or signal generating module of a second user electricity meter of the two adjacent user electricity meters; S20, monitoring, by using a direction determining module, a voltage and a current of the high-frequency signal flowing into the second user electricity meter, based on that the high-frequency signal travels through the direction determining module; and S30, obtaining a phase difference from the voltage and the current, and determining, based on an absolute value of the phase difference, a position relationship of the two adjacent user electricity meters.

In an embodiment, the S30 further includes: determining that the second user electricity meter is located downstream of the first user electricity meter, in a case that the absolute value of the phase difference is less than 90 degrees; and determining that the second user electricity meter is located upstream of the first user electricity meter, in a case that the absolute value of the phase difference is greater than 90 degrees and less than 180 degrees.

An apparatus for determining relative positions of power consumers based on a high-frequency signal is further provided in the present disclosure. The apparatus includes a signal module, a monitoring module, and a determining module.

The signal module is configured to control a resonance or signal generating module of a first user electricity meter of arbitrary two adjacent user electricity meters to transmit a high-frequency signal, and control a resonance or signal generating module of a second user electricity meter of the two adjacent user electricity meters to generate resonance in response to the high-frequency signal.

The monitoring module is configured to monitor, by using a direction determining module, a current and a voltage of the high-frequency signal flowing into the second user electricity meter, based on that the high-frequency signal travels through the direction determining module.

The determining module is configured to: obtain a phase difference from the voltage and the current, and determine, based on an absolute value of the phase difference, a position relationship of the two adjacent user electricity meters.

In an embodiment, the determining module is further configured to: determine that the second user electricity meter is located downstream of the first user electricity meter, in a case that the absolute value of the phase difference is less than 90 degrees.

In an embodiment, the determining module is further configured to determine that the second user electricity meter is located upstream of the first user electricity meter, in a case that the absolute value of the phase difference is greater than 90 degrees and less than 180 degrees.

A computer-readable storage medium is further provided in the present disclosure. The computer-readable storage medium stores computer instructions. The computer instructions, when executed on a computer, cause the computer to perform the method for determining relative positions of power consumers based on a high-frequency.

A terminal device is further provided in the present disclosure. The terminal device includes a processor and a memory. The memory is configured to store program codes and transmit the program codes to the processor. The processor is configured to perform the method for determining relative positions of power consumers based on a high-frequency signal based on instructions in the program codes.

The following advantages of the embodiments of the present disclosure can be seen from the above technical solutions. The device, the method and the apparatus for determining relative positions of power consumers based on a high-frequency signal involves the resonance or signal generating module and the direction determining module. The resonance or signal generating module is disposed in a user electricity meter, and the direction determining module is disposed on a power line. The resonance or signal generating module is configured to transmit a high-frequency signal or generate resonance in response to the high-frequency signal. The direction determining module is configured to: monitor a voltage and a current of the high-frequency signal inputted into the user electricity meter; and determine, based on a phase difference between the voltage and the current, a relative position relationship of two adjacent user electricity meters on the power line.

The device for determining relative positions of power consumers based on a high-frequency signal operates by means of signal transmitting and signal receiving. The resonance or signal generating module is disposed in each user electricity meter. The resonance or signal generating module can transmit the high-frequency signal, and can generate resonance in the user electricity meter connected to the resonance or signal generating module, to realize a zero impedance of a voltage circuit of the user electricity meter connected between the neutral wire and the live wire. The direction determining module is disposed on each power line of a branch node connected to a user electricity meter. The direction determining module can monitor a phase difference between a voltage and a current when the high-frequency signal travels through the node and determine an upstream-downstream position relationship of two user electricity meters adjacent to the direction determining module based on the phase difference. Hence, the technical problem that relative positions of power consumers in a distribution transformer supply zone determined through the conventional methods have a large error and unreliable accuracy is solved.

In the method for determining relative positions of power consumers based on a high-frequency signal according to the present disclosure, the resonance or signal generating modules in the user electricity meters serve as a transmitting source and a receiving source of the high-frequency signal, respectively, so that a signal transmission distance and a signal attenuation amplitude are reduced. Further, the phase difference is monitored by the direction determining module, so that an effectiveness and accuracy of the relative position relationship of the user electricity meters are ensured.

The method for determining relative positions of power consumers based on a high-frequency signal can be applied to various distribution transformer supply zones provided with a photovoltaic or reactive compensation device, and therefore can be widely used.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

In order to make the objectives, features and advantages of the present disclosure clear and understandable, technical solutions of embodiments of the present disclosure are clearly and completely described below in conjunction with the drawings in the embodiments of the present disclosure. Apparently, the embodiments described in the following are only some, rather than all, embodiments of the present disclosure. All other embodiments obtained by those skilled in the art based on the embodiments of the present disclosure without any creative work shall fall within the protection scope of the present disclosure.

A device, a method and an apparatus for determining relative positions of power consumers based on a high-frequency signal are provided according to embodiments of the present disclosure, in order to solve the technical problem that relative positions of power consumers in a distribution transformer supply zone determined through the conventional methods have a large error and unreliable accuracy.

First Embodiment

Figure 1:
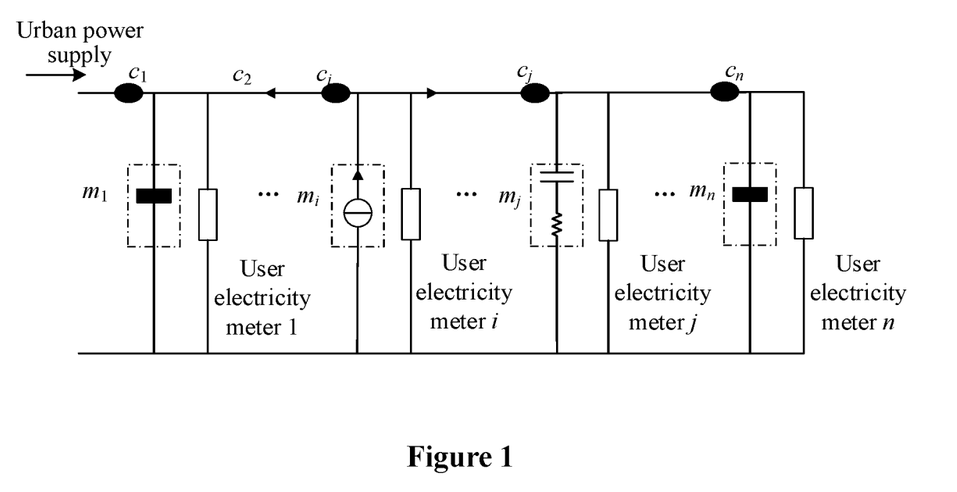
FIG. 1 is a schematic circuit diagram of a device for determining relative positions of power consumers based on a high-frequency signal according to an embodiment of the present disclosure.
Figure 2:
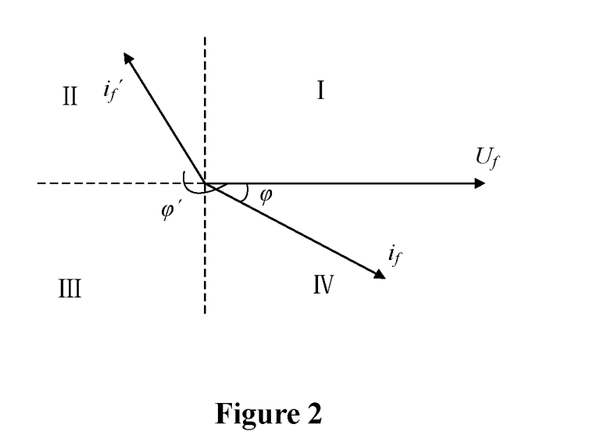
FIG. 2 is a schematic diagram showing that a direction determining module in a device for determining relative positions of power consumers based on a high-frequency signal determines a phase difference according to an embodiment of the present disclosure.

FIG. 1 is a schematic circuit diagram of a device for determining relative positions of power consumers based on a high-frequency signal according to an embodiment of the present disclosure. FIG. 2 is a schematic diagram showing that a direction determining module in a device for determining relative positions of power consumers based on a high-frequency signal determines a phase difference according to an embodiment of the present disclosure.

Reference is made to FIG. 1. A device for determining relative positions of power consumers based on a high-frequency signal is provided according to an embodiment of the present disclosure. The device is applied to a distribution transformer supply zone. The device includes a resonance or signal generating module and a direction determining module. The resonance or signal generating module is disposed in a user electricity meter, and the direction determining module is disposed on a power line.

The resonance or signal generating module is configured to transmit a high-frequency signal or generate resonance in response to the high-frequency signal.

The direction determining module is configured to: monitor a voltage and a current of the high-frequency signal inputted into the user electricity meter; and determine, based on a phase difference between the voltage and the current, a relative position relationship of two adjacent user electricity meters on the power line.

In an embodiment of the present disclosure, the user electricity meter may be an electric energy meter or other meters capable of measuring electric energy, such as a kilowatt-hour meter or an energy meter. The resonance or signal generating module and the direction determining module are provided in a complete set. The resonance or signal generating module is integrated and disposed in the user electricity meter. The direction determining module is disposed on the power line. A resonance or signal generating module in one user electricity meter is configured to transmit a high-frequency signal. A resonance or signal generating module in another user electricity meter is configured to generate resonance in response to the high-frequency signal. The direction determining module detects and determines directions of a high-frequency voltage and a high-frequency current, and thereby determines the relative position relationship of the two user electricity meters.

It should be noted that the high-frequency signal may be a high-frequency current signal, a high-frequency voltage signal, or other high-frequency signals.

In an embodiment of the present disclosure, the distribution transformer supply zone includes at least two user electricity meters. Two of the user electricity meters are connected in parallel between a neutral wire and a live wire. The live wire for the two user electricity meters serves as the power line. Each of the user electricity meters is provided with the resonance or signal generating module. The two user electricity meters are referred to as a first user electricity meter and a second user electricity meter. The resonance or signal generating module in the first user electricity meter is configured to transmit the high-frequency signal, and the resonance or signal generating module in the second user electricity meter is configured to generate resonance in response to reception of the high-frequency signal. The direction determining module is further configured to obtain a phase difference from the current and the voltage flowing into the second user electricity meter.

It should be noted that, as shown in FIG. 1, the user electricity meters are connected in parallel between the neutral wire and the live wire to form a voltage circuit. Resonance or signal generating modules in the user electricity meters are represented by $m_1, m_2, \ldots, m_n$, respectively. A resonance or signal generating module configured to transmit the high-frequency signal is equivalent to a signal source, such as the resonance or signal generating module $m_i$ in FIG. 1. In a case that a resonance or signal generating module is configured to generate resonance in response to the high-frequency signal in the voltage circuit, a user load is shorted in the voltage circuit of the user electricity meter, and the high-frequency signal all travels through a user electricity meter m 1 that generates resonance. Multiple direction determining modules disposed in the power line are represented as $c_1, c_2, \ldots, c_n$, respectively. Each of the direction determining modules can monitor a phase difference between a current and a voltage when the high-frequency signal travels through the direction determining module, that is, a phase difference between the current and the voltage flowing into the user electricity meter by the high-frequency signal traveling through the direction determining module.

It should be noted that a resonance or signal generating module $m_i$ of a first user electricity meter i is configured to transmit the high-frequency signal. The transmitted high-frequency signal has a small strength, and is superposed in a power frequency signal of the power line, which does not affect a normal operation of the power line. The resonance or signal generating module $m_j$ of the second user electricity meter j is configured to receive the high-frequency signal to generate resonance. Thereby, equivalent impedance of the voltage circuit of the user electricity meters is zero, and the high-frequency signal almost all travels through the second user electricity meter j, so that the strength of the signal received by the second user electricity meter j is enhanced. The relative position relationship between the first user electricity meter i and the second user electricity meter j is determined based on the phase difference obtained by the direction determining module $c_j$. The power frequency signal refers to a voltage signal on the power line from the power grid, that is, an alternating-current signal having a frequency of 50 Hz.

In an embodiment of the present disclosure, it is determined that the second user electricity meter is located downstream of the first user electricity meter, in a case that an absolute value of the phase difference is less than 90 degrees; and it is determined that the second user electricity meter is located upstream of the first user electricity meter, in a case that the absolute value of the phase difference is greater than 90 degrees and less than 180 degrees. The direction determining module monitors the current and the voltage of the high-frequency signal flowing into the second user electricity meter.

Reference is made to FIG. 2. It should be noted that, $U_f$ represents a voltage monitored by the direction determining module $c_j$, and $i_f$ represents the current monitored by the direction determining module $c_j$. The voltage $U_f$ is taken as a reference. In a case that the current $i_f$ is in the I quadrant or the IV quadrant, that is, the phase difference $\varphi$ satisfies $|\varphi|<90°$, it is determined that the voltage and the current monitored by the direction determining module $c_j$ are in a same direction, and the second user electricity meter j is located downstream of the first user electricity meter i. In a case that the current $i_f$ is in the II quadrant or the III quadrant, that is, the phase difference $\varphi$ satisfies $180°>|\varphi|>90°$, it is determined that the voltage and the current monitored by the direction determining module $c_j$ are in opposite directions, and the second user electricity meter j is located upstream of the first user electricity meter i.

The device for determining relative positions of power consumers based on a high-frequency signal according to the present disclosure includes the resonance or signal generating module and the direction determining module. The resonance or signal generating module is disposed in a user electricity meter, and the direction determining module is disposed on a power line. The resonance or signal generating module is configured to transmit a high-frequency signal or generate resonance in response to the high-frequency signal. The direction determining module is configured to: monitor a voltage and a current of the high-frequency signal inputted into the user electricity meter; and determine, based on a phase difference between the voltage and the current, a relative position relationship of two adjacent user electricity meters the power line.

The device for determining relative positions of power consumers based on a high-frequency signal operates by means of signal transmitting and signal receiving. The resonance or signal generating module is disposed in each user electricity meter. The resonance or signal generating module can transmit the high-frequency signal, and can generate resonance in the user electricity meter connected to the resonance or signal generating module, to realize a zero impedance of a voltage circuit of the user electricity meter connected between the neutral wire and the live wire. The direction determining module is disposed on each power line of a branch node connected to a user electricity meter. The direction determining module can monitor a phase difference between a voltage and a current when the high-frequency signal travels through the node and determine an upstream-downstream position relationship of two user electricity meters adjacent to the direction determining module based on the phase difference. Hence, the technical problem that relative positions of power consumers in a distribution transformer supply zone determined through the conventional methods have a large error and unreliable accuracy is solved.

Second Embodiment

Figure 3:
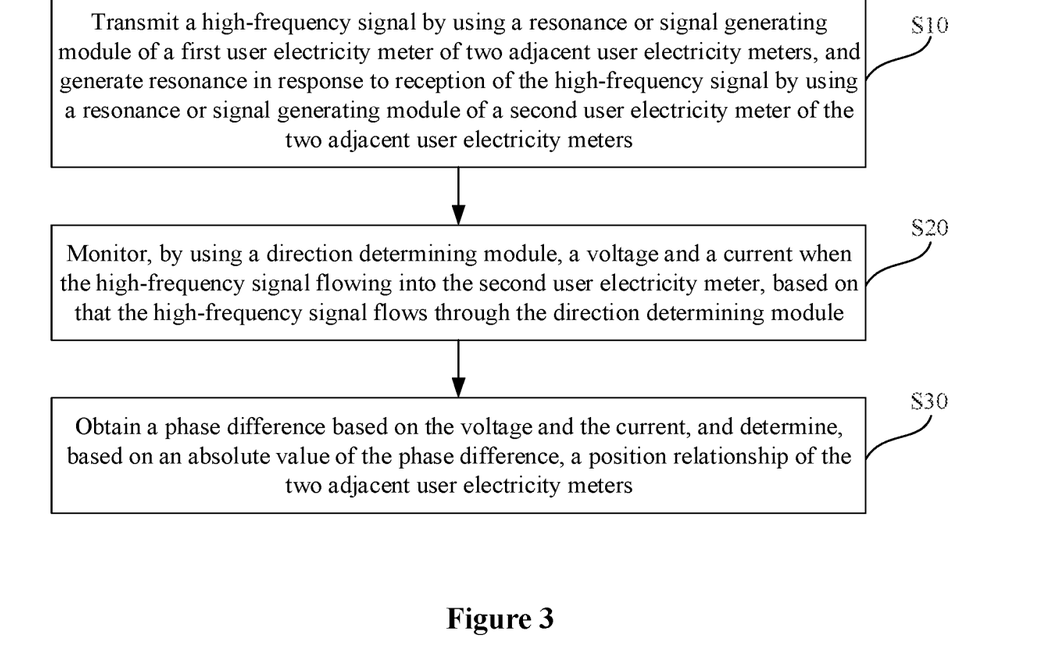
FIG. 3 is a flow chart of a method for determining relative positions of power consumers based on a high-frequency signal according to an embodiment of the present disclosure.

FIG. 3 is a flow chart of a method for determining relative positions of power consumers based on a high-frequency signal according to an embodiment of the present disclosure.

As shown in FIG. 3, a method for determining relative positions of power consumers based on a high-frequency signal is further provided according to an embodiment of the present disclosure. The method is applied to a distribution transformer supply zone. The method is based on the device for determining relative positions of power consumers based on a high-frequency signal described above, and includes the following steps S10 to S30.

In S10, a resonance or signal generating module of a first user electricity meter of arbitrary two adjacent user electricity meters transmits a high-frequency signal, and a resonance or signal generating module of a second user electricity meter of the two adjacent user electricity meters generates resonance in response to reception of the high-frequency signal.

In S20, a direction determining module monitors a voltage and a current of the high-frequency signal flowing into the second user electricity meter, based on that the high-frequency signal travels through the direction determining module.

In S30, a phase difference is obtained based on the voltage and the current, and a position relationship of the two adjacent user electricity meters is determined based on an absolute value of the phase difference.

In an embodiment of the present disclosure, in S30, it is determined that the second user electricity meter is located downstream of the first user electricity meter, in a case that the absolute value of the phase difference is less than 90 degrees; and it is determined that the second user electricity meter is located upstream of the first user electricity meter, in a case that the absolute value of the phase difference is greater than 90 degrees and less than 180 degrees.

It should be noted that the first user electricity meter is one of the arbitrary two adjacent user electricity meters, and the second user electricity meter is another one of the arbitrary two adjacent user electricity meters.

In an embodiment of the present disclosure, the direction determining module mentioned in S20 is disposed on a power line connected between the two adjacent user electricity meters.

In an embodiment of the present disclosure, the method is performed by repeating the S10 to S30 to determine position relationships of every two of the user electricity meters in the distribution transformer supply zone. Thereby, relative positions of all power consumer electricity meters in the distribution transformer supply zone are determined.

It should be noted that the resonance or signal generating module and the direction determining module in the method according to the second embodiment are described in detail in the first embodiment, and therefore are not described in detail in the second embodiment.

In an embodiment of the present disclosure, in step S20 and step S30, the resonance or signal generating module of the first user electricity meter is configured to transmit the high-frequency signal, the high-frequency signal is superimposed on a power frequency signal through a current coupling circuit and is transmitted through the power line to the resonance or signal generating module of the second user electricity meter through the power line, so that the resonance or signal generating module of the second user electricity meter generates resonance. The high-frequency signal travels through the direction determining module on the power line. Then the high-frequency signal is separated from the power frequency signal by a decoupling circuit. The high-frequency signal is separated for detection. The relative positions of the two user electricity meters are determined based on the phase difference monitored by the direction determining module.

It should be noted that the current coupling circuit is a high-pass filtering circuit, and includes a reactor and a capacitor. In an embodiment, the current coupling circuit is configured to superimpose the high frequency signal to the power frequency signal by using a high-pass filter.

In the method for determining relative positions of power consumers based on a high-frequency signal according to the present disclosure, the resonance or signal generating modules in the user electricity meters respectively serve as a transmitter and a receiver of the high-frequency signal, so that a signal transmission distance is reduced and a signal attenuation amplitude is reduced. Further, the phase difference is monitored by the direction determining module, so that an effectiveness and accuracy of the relative position relationship of the user electricity meters are ensured.

The method for determining relative positions of power consumers based on a high-frequency signal according to the present disclosure can be applied to various distribution transformer supply zones provided with a photovoltaic or reactive compensation device, and can be widely used.

Third Embodiment

Figure 4:
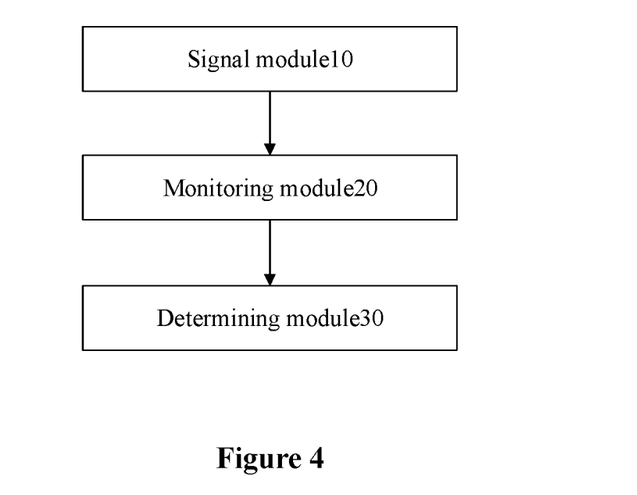
FIG. 4 is a block diagram of an apparatus for determining relative positions of power consumers based on a high-frequency signal according to an embodiment of the present disclosure.

FIG. 4 is a block diagram of an apparatus for determining relative positions of power consumers based on a high-frequency signal according to an embodiment of the present disclosure.

As shown in FIG. 4, an apparatus for determining relative positions of power consumers based on a high-frequency signal is further provided according to an embodiment of the present disclosure. The apparatus includes a signal module 10, a monitoring module 20, and a determining module 30.

The signal module 10 is configured to control a resonance or signal generating module of a first user electricity meter of arbitrary two adjacent user electricity meters to transmit a high-frequency signal, and control a resonance or signal generating module of a second user electricity meter of the two adjacent user electricity meters to generate resonance in response to reception of the high-frequency signal.

The monitoring module 20 is configured to monitor, by using a direction determining module, a current and a voltage of the high-frequency signal flowing into the second user electricity meter, based on that the high-frequency signal travels through the direction determining module.

The determining module 30 is configured to: obtain a phase difference from the voltage and the current; and determine, based on an absolute value of the phase difference, a position relationship of the two adjacent user electricity meters.

In an embodiment of the present disclosure, the determining module 30 is further configured to determine that the second user electricity meter is located downstream of the first user electricity meter, in a case that the absolute value of the phase difference is less than 90 degrees.

In an embodiment of the present disclosure, the determining module 30 is further configured to determine that the second user electricity meter is located upstream of the first user electricity meter, in a case that the absolute value of the phase difference is greater than 90 degrees and less than 180 degrees.

It should be noted that the modules in the apparatus according to the third embodiment correspond to the steps in the method according to the second embodiment. The steps in the method according to the second embodiment are described in detail in the second embodiment, and the modules in the apparatus are not described in detail in the third embodiment.

Fourth Embodiment

A computer-readable storage medium is provided according to an embodiment of the present disclosure. The computer-readable storage medium stores computer instructions. The computer instructions, when executed on a computer, cause the computer to perform the method for determining relative positions of power consumers based on a high-frequency signal.

Fifth Embodiment

A terminal device is provided according to an embodiment of the present disclosure. The terminal device includes a processor and a memory.

The memory stores program codes, and is configured to transmit the program codes to the processor.

The processor is configured to perform the method for determining relative positions of power consumers based on a high-frequency signal based on instructions in the program codes.

It should be noted that the processor is configured to perform the method for determining relative positions of power consumers based on a high-frequency signal according to any one of the above embodiments based on instructions in the program codes. Alternatively, the processor implements, when executing a computer program, function(s) of modules or units in the system or device according to at least one of the above embodiments.

For example, the computer program may include one or more modules or units. The one or more modules or units are stored in the memory and executed by the processor to implement the present disclosure. The one or more modules or units may be a series of computer program instruction segments capable of completing specific functions. The instruction segments describe execution of the computer program in the terminal device.

The terminal device may be a desktop computer, a laptop, a palmtop computer, a cloud server, or other computing devices. The terminal device may include, but is not limited to, the processor and the memory. Those skilled in the art can understand that the drawings do not constitute a limitation to the terminal device. The terminal device may include more or less components than those shown in a figure, or include a combination of some components, or components different from those shown in the figure. For example, the terminal device may further include an input device, an output device, a network access device, a bus, and the like.

The processor may be a central processing unit (CPU), a general-purpose processor, a digital signal processor (DSP), an application specific integrated circuit (ASIC), a field-programmable gate array (FPGA), any other programmable logic device, a discrete gate, a transistor logic device, a discrete hardware component, and the like. The general-purpose processor may be a microprocessor or any regular processor.

The memory may be an internal storage unit of the terminal device, such as a hard disk or a memory of the terminal device. Alternatively, the memory may be an external storage device of the terminal device, such as a plug-in hard disk, a smart memory card (SMC), a secure digital (SD) card, or a flash card disposed on the terminal device. Further, the memory may include both the internal storage unit and the external storage device of the terminal device. The memory is configured to store a computer program and other programs and data required by the terminal device. The memory may be further configured to temporarily store outputted data or to-be-outputted data.

Those skilled in the art can clearly understand that, for ease and simplicity of description, reference may be made to the foregoing method embodiments for operations of the system, apparatus and units, which are not repeated here.

It should be understood that the system, apparatus and method disclosed in the embodiments according to the present disclosure may be implemented in other ways. For example, the embodiments of the device are only illustrative. For example, the units are defined based on logical functions, and there may be other manners in practice. For example, multiple units or components may be combined with each other, or integrated into another system; and some features may be omitted or may not be performed. In addition, the mutual coupling, direct coupling or communication connection shown or discussed may refer to an indirect coupling or communication connection via a certain interface, apparatus or unit, and may be electrical, mechanical or of other forms.

The units described as separate components may or may not be physically separated. The components shown as units may or may not be physical units, that is, the components may be located in a same location, or may be distributed to multiple network units. Some or all of the units may be implemented based on an actual need to achieve the objective of the technical solutions of an embodiment.

In addition, functional units in the embodiments of the present disclosure may be integrated into a single processing unit, or may be separately exist. Two or more of the units may be integrated into a single unit. Integration of the units may be implemented by hardware or in a form of a software functional unit.

In a case that the integration of the units is implemented in the form of a software functional unit, and is sold or used as an independent product, the integrated unit may be stored in a computer-readable storage medium. Based on such understanding, the essence of the technical solutions of the present disclosure, or parts of the technical solutions which contribute to the conventional technology, or all or parts of the technical solutions may be embodied in the form of a software product. The computer software product is stored in a storage medium, and includes instructions which enables a computer device (such as a personal computer, a server, or a network device) to perform all or part of the method according to the embodiments of the present disclosure. The foregoing storage medium includes a U disk, a removable hard disk, a read-only memory (ROM), a random-access memory (RANI), a magnetic disk, an optical disk, or other media that can store program codes.

The above embodiments are only for illustrating the technical solutions of the present disclosure, and are not intended to limit the present disclosure. Although the present disclosure is illustrated in detail with reference to the embodiments described above, those skilled in the art should understand that modification can be made to the technical solutions in the embodiments, or equivalent substitution can be made onto a part of technical features of the technical solutions. Such modification and equivalent substitution do not make the corresponding technical solutions deviate from spirit and the scope of the technical solutions of the embodiments of the present disclosure.

The invention claimed is:

1. A device for determining relative positions of power consumers based on a high-frequency signal, applied to a distribution transformer supply zone, wherein the device comprises:

a resonance or signal generator and a direction detector, the resonance or signal generator is disposed in a user electricity meter the direction detector is disposed on a power line, the resonance or signal generator is configured to transmit a high-frequency signal or generate resonance in response to the high-frequency signal;

the direction detector is configured to monitor a voltage and a current of the high-frequency signal inputted into the user electricity meter, and determine, based on a phase difference between the voltage and the current, a relative position relationship of two adjacent user electricity meters on the power line disposed with the direction detector;

wherein a number of the user electricity meters at the distribution transformer supply zone is at least two the two user electricity meters are connected in parallel between a neutral wire and a live wire;

the live wire for the two user electricity meters serves as the power line; each of the user electricity meters is provided with the resonance or signal generator and the two user electricity meters are referred to as a first user electricity meter and a second user electricity meter; and the direction detector is further configured to: obtain a phase difference from the current and the voltage flowing into the second user electricity meter determine that the second user electricity meter is located downstream of the first user electricity meter, in a case that an absolute value of the phase difference is less than 90 degrees; and determine that the second user electricity meter is located upstream of the first user electricity meter, in a case that the absolute value of the phase difference is greater than 90 degrees and less than 180 degrees.

2. The device for determining relative positions of power consumers based on a high-frequency signal according to claim 1, wherein the resonance or signal generator in the first user electricity meter is configured to transmit the high-frequency signal, the resonance or signal generator in the second user electricity meter is configured to generate resonance in response to reception of the high-frequency signal; and the direction detector is configured to monitor a voltage and a current of the high-frequency signal flowing into the second user electricity meter.

3. A method for determining relative positions of power consumers based on a high-frequency signal, applied to a distribution transformer supply zone, wherein the method is implemented by the device for determining relative positions of power consumers based on a high-frequency signal according to claim 1, and the method comprises: S10, transmitting a high-frequency signal by using a resonance or signal generator of a first user electricity meter of arbitrary two adjacent user electricity meters, and generating resonance in response to reception of the high-frequency signal by using a resonance or signal generator of a second user electricity meter of the two adjacent user electricity meters; S20, monitoring, by using a direction detector, a voltage and a current of the high-frequency signal flowing into the second user electricity meter, based on that the high-frequency signal travels through the direction detector; and S30, obtaining a phase difference from the voltage and the current, and determining, based on an absolute value of the phase difference, a position relationship of the two adjacent user electricity meters wherein the S30 further comprises: determining that the second user electricity meter is located downstream of the first user electricity meter, in a case that the absolute value of the phase difference is less than 90 degrees; and determining that the second user electricity meter is located upstream of the first user electricity meter, in a case that the absolute value of the phase difference is greater than 90 degrees and less than 180 degrees.

4. A terminal device, comprising a processor and a memory, wherein the memory is configured to store program codes and transmit the program codes to the processor; and the processor is configured to perform, based on instructions in the program codes, the method according to claim 3.

* * * * *